US008541084B2

(12) United States Patent
Deiss et al.

(10) Patent No.: US 8,541,084 B2

(45) Date of Patent: Sep. 24, 2013

(54) SEALING TAPE

(75) Inventors: Martin Deiss, Abtsgmuend (DE); Peter Schiano, Aalen (DE)

(73) Assignee: ISO-Chemie GmbH (DE)

(*) Notice: Subject to any disclaimer, the term of this patent is extended or adjusted under 35 U.S.C. 154(b) by 0 days.

(21) Appl. No.: 13/196,561

(22) Filed: Aug. 2, 2011

(65) Prior Publication Data

US 2012/0031032 A1 Feb. 9, 2012

(30) Foreign Application Priority Data

Aug. 5, 2010 (EP) .................................... 10172042

(51) Int. Cl.

*B32B 9/00* (2006.01)
*B32B 5/18* (2006.01)
*B32B 7/10* (2006.01)
*B32B 3/02* (2006.01)
*E04C 1/00* (2006.01)

(52) U.S. Cl.

USPC ............ 428/40.1; 428/98; 428/119; 428/156; 428/158; 52/309.1; 52/309.4; 52/309.5

(58) Field of Classification Search

USPC .................. 428/40.1, 343, 98, 119, 156, 192, 428/317.1, 317.3, 158; 52/309.1, 309.4, 52/309.5

See application file for complete search history.

(56) References Cited

U.S. PATENT DOCUMENTS

| | | | | |
|---|---|---|---|---|
| 4,204,373 | A | 5/1980 | Davidson | |
| 4,509,999 | A * | 4/1985 | Sandor | 156/71 |
| 5,277,954 | A * | 1/1994 | Carpenter et al. | 428/71 |
| 6,548,163 | B1 * | 4/2003 | Hills | 428/343 |
| 6,595,525 | B2 * | 7/2003 | Schmidt | 277/630 |

FOREIGN PATENT DOCUMENTS

| | | | |
|---|---|---|---|
| DE | 8332587 | U1 | 2/1984 |
| DE | 8621064 | U1 | 12/1986 |
| DE | 102004012473 | A1 | 10/2005 |
| DE | 202009002918 | U1 | 7/2010 |
| EP | 1131525 | B1 | 9/2000 |
| EP | 1936246 | A1 | 12/2006 |
| EP | 1936247 | A1 | 9/2007 |
| WO | WO9845565 | A1 | 10/1998 |

* cited by examiner

*Primary Examiner* — Patricia Nordmeyer

(74) *Attorney, Agent, or Firm* — Jansson Munger McKinley & Shape Ltd.

(57) ABSTRACT

The sealing tape for sealing a joint has a first foam strip with a top surface and a bottom surface, a second foam strip with a top surface and a bottom surface, and a sheet-like connecting element, which comprises a first attachment section, a second attachment section, and a middle section between the two attachment sections. The first attachment section is attached to the first foam strip; the second attachment section is attached to the second foam strip; and the middle section extends from the top surface of the first foam strip to the bottom surface of the second foam strip when the middle section is stretched out straight.

15 Claims, 6 Drawing Sheets

SEALING TAPE

CROSS REFERENCE TO RELATED APPLICATION

This application claims priority based on European patent application EP 10 172 042.3, filed Aug. 5, 2010.

FIELD OF THE INVENTION

The invention relates to a sealing tape for sealing a joint such as that between the frame sections of a window or door and the wall of a building.

BACKGROUND OF THE INVENTION

A precompressed sealing tape is known from EP 1 131 525 A, which consists of an elastically recoverable foam strip of rectangular cross section, which, when in the compressed state, is completely surrounded by a wrapping, which is formed by a sheet of plastic. The plastic sheet is adhered to itself to form a tear-off tab extending in the longitudinal direction of the sealing tape thus creating a predetermined tear-off line. To hold the foam strip inside the pocket formed in this way, the bottom surface of the strip is adhered to the wrapping, and the wrapping for its own part can be adhered by its bottom surface to a frame section by the use of separate adhesive means such as double-sided adhesive tape.

Sealing tapes of this type are adhered to the frame section to be sealed, and after the frame section has been installed in an opening in the wall of a building, the wrapping is torn open to allow the foam strip to return elastically to its original shape, which thus seals off the frame section against the building wall. The disadvantage of these known sealing tapes, however, is that they can be produced only in relatively small widths, because otherwise, as a result of the restoring force of the precompressed sealing tape, an oval-to-round shape is produced inside the wrapping, which is unsuitable for installation. As a result of the continuously increasing requirements on the quality of sealing in buildings, however, it is desirable to provide precompressed sealing tapes in any desired width in order to achieve higher sealing values, better thermal insulation, and better sound-damping properties.

Sealing tapes which consist of a combination of a flexible foam strip and a plastic sheet are known from EP 1 936 246 A and EP 1 936 247 A. These sealing tapes lead to better sealing properties as a result of the definable position of the plastic sheet in the installed state. Sealing tapes of this type, however, are not suitable for deep joints.

U.S. Pat. No. 4,204,373 discloses a sealing tape which consists of a flat base strip, which is to be adhered to a frame section, and a foam strip on top of the base strip. The foam strip is covered by a sheet of paper or plastic, which is adhered to the flat base strip and holds the foam strip in the compressed state. Ripcord threads extend along the edge of the cover sheet, by the use of which the sheet can be torn open after the frame section provided with the sealing tape has been installed in the building structure.

WO 98/45565 A describes a sealing strip of foam, which is surrounded by a wrapper. A stiff layer of cardboard or plastic can also be provided in the wrapper. When the sheet-like wrapper is opened, the foam strip expands slightly in the joint to be sealed, into which it has been loosely inserted.

These embodiments suffer from the disadvantage that the stiff layer remaining in the joint does not meet the higher modern demands on thermal insulation and high sealing values, and thus the overall sealing element is unsuitable for long-term use. In addition, a very large amount of material is consumed in the case of deep joints.

SUMMARY OF THE INVENTION

It is an object of the present invention to provide a sealing tape which is simple in design and easy to handle and which, while requiring only a small amount of material, seals joints of any depth.

According to an aspect of the invention, the sealing tape comprises a first foam strip having a top surface and a bottom surface; a second foam strip having a top surface and a bottom surface; and a sheet-like connecting element, which comprises a first attachment section, a second attachment section, and a middle section between the first two sections, wherein at least part of the first attachment section is attached to a first foam strip, at least part of the second attachment section is attached to the second foam strip, and the middle section extends from the top surface of the first foam strip to the bottom surface of the second foam strip when the middle section is stretched out straight.

As a result, the consumption of foam material for deep joints can be considerably reduced, and, because of the defined position of the sheet-like connecting element, the reliable sealing of the joint can be guaranteed. With this design, furthermore, the sheet-like connecting element is protected from damage during transport and handling.

The middle section of the sheet-like connecting element is preferably not attached to the first or second foam strip. This makes it possible to modify the sealing tape in various ways so that it can accommodate a wide variety of applications.

So that the sealing tape can be attached easily to a structural component to be sealed, a first pressure-sensitive adhesive layer, which is covered by a first cover sheet, can be provided on the bottom surface of the first foam strip.

For the same purpose, a second pressure-sensitive adhesive layer can also be provided on the bottom surface of the second foam strip, this adhesive layer being covered by a second cover sheet.

It is advantageous for the second pressure-sensitive adhesive layer to be arranged under the second attachment section of the sheet-like connecting element.

In a preferred embodiment, the first pressure-sensitive adhesive layer and the second pressure-sensitive adhesive layer can be integrated with each other and formed by a one-piece, stretchable pressure-sensitive adhesive strip. As a result, the sealing tape can be produced easily, while at the same time superior ease of handling for joints of any depth is achieved.

A further embodiment of the sealing tape can include an additional pressure-sensitive adhesive layer provided on the top surface of the first foam strip, this adhesive layer being covered by another cover sheet. As a result, the number of different ways in which the sealing tape can be attached to the structural component is further increased.

In an additional embodiment of the sealing tape, an additional pressure-sensitive adhesive layer can be arranged on the top surface of the second foam strip, this adhesive layer being covered by an additional cover sheet.

As easy and reliable way to adhere the sheet-like connecting element to the foam strip is to attach the first attachment section and the second attachment section of the sheet-like connecting element to the first and second foam strips by means of a layer of adhesive.

This layer of adhesive can be omitted if the double-sided pressure-sensitive adhesive layers which serve to attach the sealing tape to the structural component are used as the adhesive means. This can be done successfully if the first attachment section and/or the second attachment section of the sheet-like connecting element comprises openings.

To shorten the middle section of the sheet-like connecting element and to orient it as close to the perpendicular as possible, the top surface of the second foam strip can be made shorter than the bottom surface of the second foam strip, and the bottom surface of the first foam strip can be made shorter than the top surface of the first foam strip.

To allow the sealing tape can be stored securely and in a space-saving manner, it can be wound up into a roll of sealing tape. The first foam strip and the second foam strip can be wound up next to each other on a winding tube, which makes it easier to handle the tape during use.

Alternatively, the first foam strip and the second foam strip can be wound up on top of each other on a winding tube, which has the effect of minimizing the width of the sealing tape roll.

A structural component to which a sealing tape according to the invention is attached is preferably characterized in that the first foam strip and the second foam strip are arranged next to each other with an intermediate space is formed therebetween, through which the sheet-like connecting element extends.

BRIEF DESCRIPTION OF THE DRAWINGS

In order that the advantages of the invention will be readily understood, a more detailed description of the invention briefly described above will be rendered by reference to specific embodiments that are illustrated in the appended drawings. Understanding that these drawings depict only typical embodiments of the invention and are not therefore to be considered to be limiting of its scope, the invention will be described and explained with additional specificity and detail through the use of the accompanying drawings, in which.

DETAILED DESCRIPTION OF THE INVENTION

Figure 1:
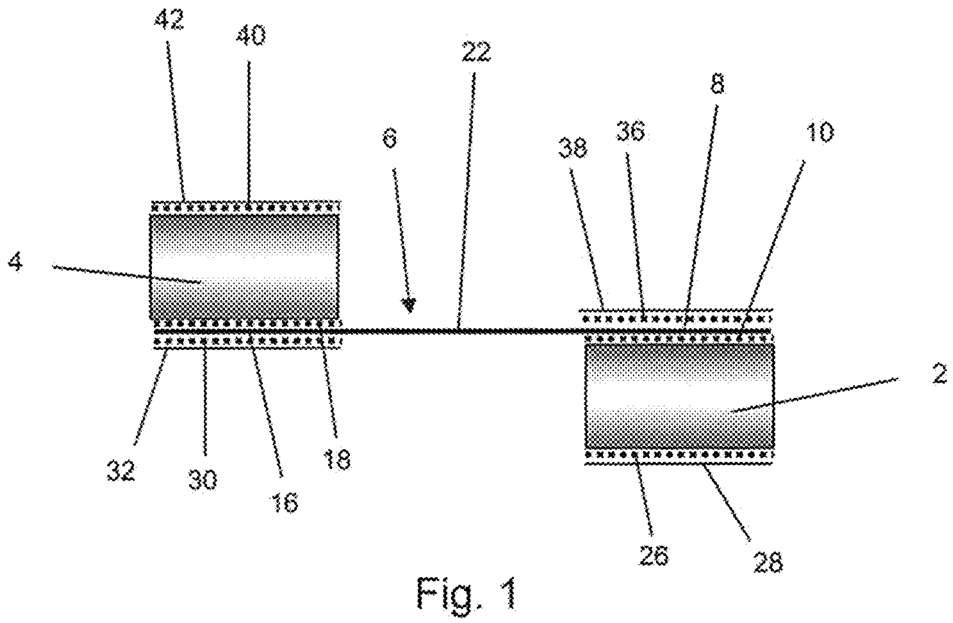
FIG. 1 is a cross-sectional view of an embodiment of the sealing tape.

In the drawings, foam strips, sheet-like connecting elements, adhesive layers, and cover sheets are in some cases shown a certain distance apart so that the individual elements which make up the sealing tape can be clearly distinguished from each other. In reality, these elements lie substantially directly on each other.

Each of FIGS. 1-10 shows a sealing tape, which comprises at least one first foam strip 2 and one second foam strip 4. In most of the exemplary embodiments shown, foam strips 2, 4 have a rectangular cross section, but many other shapes are also conceivable. Foam strips 2, 4 can be made of out any desired open-cell or closed-cell flexible foam, e.g., of polyurethane or polyethylene, and can be impregnated to delay their recovery after release from the compressed state. The bulk density of these types of flexible foams is in the range of 20-200 kg/m$^3$.

The materials of first foam strip 2 and of second foam strip 4 can be different from each other so as to ensure different air permeabilities of the sealing tape in the internal and external areas or to create a vapor diffusion gradient. Moisture will flow by diffusion because of a concentration gradient as well as a temperature gradient (from "more to less" as well as "from warm to cold"). Such a vapor diffusion gradient provides a gradual reduction of the air flow, moisture content and ambient air temperature across the sealing strip between the internal and external areas. The width of foam strips 2, 4 can also be different, as can their height or their impregnation.

In practice, foam strips 2, 4 are usually precompressed in such a way that, when released, they expand to a thickness which is preferably approximately 5 to approximately 10 times their thickness in the precompressed state. Frequently, however, use is made of only about half of this expansion to guarantee that the tape will rest securely against the part of the building located opposite the profile section to be sealed.

Figure 3:
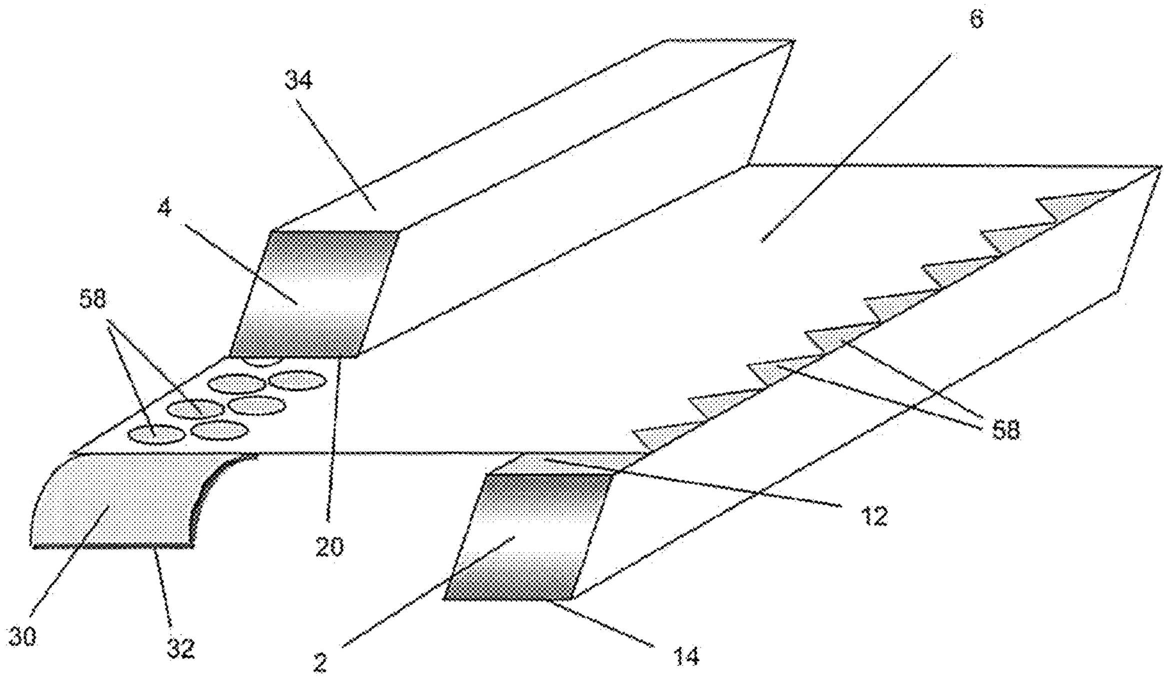
FIG. 3 is a perspective schematic diagram of another embodiment of the sealing tape.

As can be seen in FIG. 3, foam strips 2, 4 extend farther in their longitudinal direction than in their transverse direction. Foam strips 2, 4 are connected by a sheet-like connecting element 6.

Sheet-like connecting element 6 preferably consists of a sheet of plastic such as polyethylene, polypropylene, or polyvinyl chloride or a sheet of rubber. Alternatively, sheet-like connecting element 6 can consist of a foamed plastic such as a foam made from polyethylene, polypropylene, or cellular rubber. The material of sheet-like connecting element 6 can also be made of aluminum, scrim, paper, or some other material which is suitable for the above-cited application purpose. It is also possible, for example, to use laminated sheets consisting of a plastic sheet laminated to a support material (e.g., nonwoven) or fabric-reinforced sheets. All these materials are described collectively by the term "sheet-like". Combinations of these materials are also possible. Especially preferred are airtight sheets, which seal off the joint toward the interior of the room without the possibility of vapor diffusion. The thickness of sheet-like connecting element 6 is between approximately 10 μm and approximately 5 mm, preferably between approximately 50 μm and approximately 2 mm.

As can be seen best in FIG. 1, sheet-like connecting element 6 comprises a first attachment section 8, which is assigned to first foam strip 2, and at least part of which is attached to this strip. In the exemplary embodiment shown here, first attachment section 8 of sheet-like connecting element 6 is attached to first foam strip 2 by means of a first adhesive layer 10. In practice, adhesive layer 10 will frequently be laminated onto foam strip 2. In certain cases, a mesh fabric or support sheet, a nonwoven, or the like can be embedded in this adhesive layer 10 to increase its tensile strength. The expression "adhesive layer" used above should therefore also be understood to comprise adhesive layers of the type described here. This also applies to all of the other adhesive layers mentioned in this document and to the pressure-sensitive adhesive layers.

First adhesive layer 10, as well as all of the other adhesive layers cited in the document, is preferably designed as double-side adhesive tape, which produces a firmly adhering bond between first foam strip 2 and first attachment section 8 of sheet-like connecting element 6. A tight bond can also be achieved by other means such as by thermoplastic lamination. These remarks also apply to all of the adhesive layers or pressure-sensitive adhesive layers referred to herein.

In the present exemplary embodiment, first adhesive layer 10 is formed on the top surface 12 of first foam strip 2 and covers it completely. It is also possible for sheet-like connecting element 6 to be adhered to only part of top surface 12 of first foam strip 2, or for sheet-like connecting element 6 to extend across top surface 12 of first foam strip 2 and to be attached not to the top surface but rather to one of the lateral surfaces or to the bottom surface 14, even though this is not shown in the illustrated embodiments. It is also possible for sheet-like connecting element 6 to be attached to first foam strip 2 only at individual points. Such constructions in these alternative embodiments also hold true for second foam strip 4.

In analog fashion, sheet-like connecting element 6 comprises a second attachment section 16, at least part of which is attached to second foam strip 4. Second attachment section 16 is preferably attached by means of a second adhesive layer 18, which is preferably arranged on the bottom surface 20 of second foam strip 4. With respect to the various ways in which this attachment can be achieved, what was said above concerning first attachment section 8 also applies to attachment of second attachment section 16.

Between first attachment section 8 and second attachment section 16, sheet-like connecting element 6 comprises a middle section 22, which extends from top surface 12 of first foam strip 2 to bottom surface 20 of second foam strip 4. This middle section 22 of sheet-like connecting element 6 is preferably not attached to either first or second foam strip 2, 4 but instead remains freely exposed. So that the sealing tape can be attached securely to the structural component 24 to be sealed (see FIGS. 7-9), the sealing tape preferably comprises several pressure-sensitive adhesive layers. On bottom surface 14 of first foam strip 2, there is preferably a first pressure-sensitive adhesive layer 26, which is covered by a first cover sheet 28. On bottom surface 20 of second foam strip 4 there is preferably a second pressure-sensitive adhesive layer 30, which is covered by a second cover sheet 32. This second pressure-sensitive adhesive layer 30 is preferably arranged under second attachment section 16 of sheet-like connecting element 6 and is applied thereto.

The terms "top surface" and "bottom surface" of foam strips 2, 4 must be specified more closely in this regard, as two foam strips 2, 4 can be turned around with respect to each other in any desired way. Accordingly, as used herein the "top surface" of foam strips 2, 4 designates whichever surface of foam strip 2, 4 in question is facing upward when middle section 22 of sheet-like connecting element 6 is stretched out straight, and the "bottom surface" designates whichever surface is facing downward under the same conditions. If middle section 22 is not stretched out straight as in the cases shown in FIGS. 5*b*, 6, 8, and 9, this middle section must be considered stretched out, so that the top and bottom surfaces of foam strips 2, 4 can be determined. In these exemplary embodiments, the sides shown at the top and bottom are not the "top surface" and "bottom surface" of foam strips 2, 4. In FIG. 9, for example, according to the definition given above, bottom surface 20 of second foam strip 4 is the lateral surface on the left of strip 4, because this is the surface which would be facing downward after middle section 22 is straightened out.

As an addition or alternative to the pressure-sensitive adhesive layers mentioned above, top surfaces 12, 34 of first and second foam strips 2, 4 can also be provided with a pressure-sensitive adhesive layer. In the exemplary embodiment shown, a third pressure-sensitive adhesive layer 36 is arranged on top surface 12 of first foam strip 2; this third adhesive layer is covered by a third cover sheet 38. A fourth pressure-sensitive adhesive layer 40, which will then be covered by a fourth cover sheet 42, can be arranged on top surface 34 of second foam strip 4. Third pressure-sensitive adhesive layer 36 is arranged above first attachment section 8 of sheet-like connecting element 6 and is applied to it. Any number of pressure-sensitive adhesive layers 26, 30, 36, 40 can be selected depending on the purpose to be served. It is advantageous, however, to provide a pressure-sensitive adhesive layer 26, 30, 36, 40 to attach the sealing tape to structural component 24. Pressure-sensitive adhesive layers 26, 30, 36, 40 preferably consist of an adhesive compound (acrylate, butyl, or the like), whereas cover sheets 28, 32, 38, 42 are preferably designed as peel-off paper.

Figure 2:
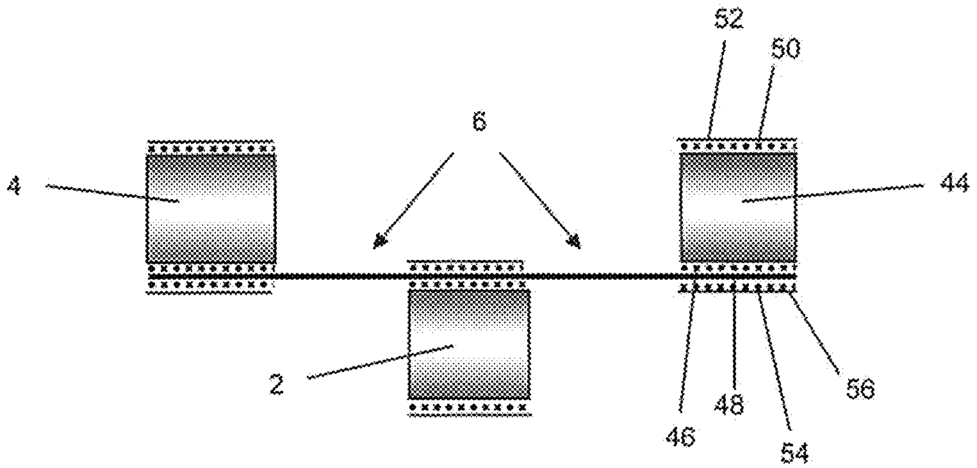
FIG. 2 is a cross-sectional view of another embodiment of the sealing tape.

FIG. 2 shows an embodiment of the sealing tape with an additional, i.e., a third foam strip 44. Third foam strip 44 is provided on its bottom surface with a third adhesive layer 46, which is connected to a third attachment section 48 of sheet-like connecting element 6. In addition, a fifth pressure-sensitive adhesive layer 50 with its assigned fifth cover sheet 52 is provided on third foam strip 44, preferably on its top surface; and a sixth pressure-sensitive adhesive layer 54 with its assigned sixth cover sheet 56 is preferably provided on the bottom surface of this foam strip. With respect to the attachment and arrangement of the individual elements, what was said above concerning first two foam strips 2, 4 also applies here.

In the case of the embodiment shown in FIG. 3, different types of openings 58 are formed in first attachment section 8 and in second attachment section 16 of sheet-like connecting element 6. The shape of the openings 58 can be oval, as shown on the left, or triangular, as shown on the right. Any other geometric shape is also conceivable. In addition to the exemplary embodiment shown here, the openings 58 can be formed only on one side of the sheet-like connecting element 6. Openings 58 have the effect that either first adhesive layer 10 between first foam strip 2 and sheet-like connecting element 6 or second adhesive layer 18 between second foam strip 4 and sheet-like connecting element 6 can be omitted, or that second pressure-sensitive adhesive layer 30 or third pressure-sensitive adhesive layer 36 can be omitted, because the adhesive means arranged in each case on the other side of sheet-like element 6 act through openings 58 to ensure a secure adhesive bond.

Figure 4:
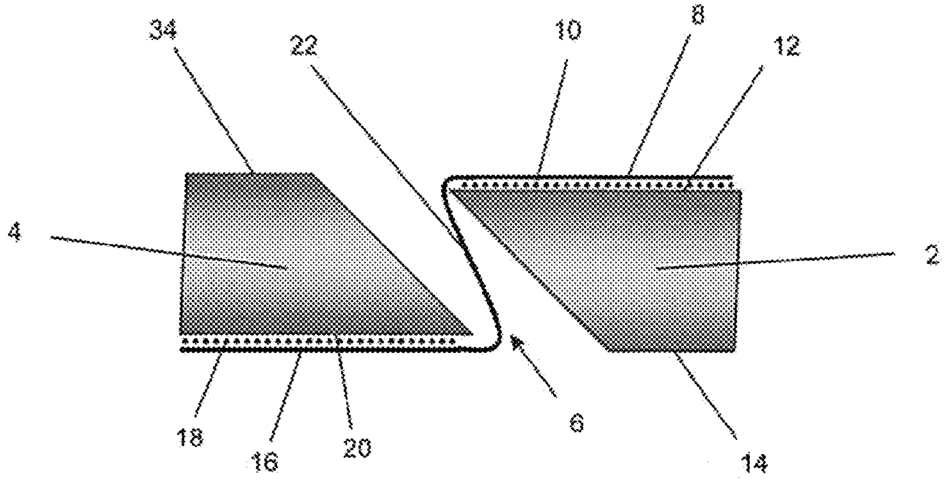
FIG. 4 is a cross-sectional view of another embodiment of the sealing tape.

FIG. 4 shows another embodiment of the sealing tape. Bottom surface 14 of first foam strip 2 is shorter than top surface 12 of first foam strip 2, and bottom surface 20 of second foam strip 4 is longer than top surface 34 of second foam strip 4. In this way, the length of middle section 22 of sheet-like connecting element 6 can be made as short as possible and can have an essentially perpendicular orientation. The two wedge-shaped foam strips 2, 4 can be produced without generating waste by cutting a foam block at a slant.

The sealing tape can be produced basically either in the form of a strip or in the form of a sealing tape roll. FIGS. 5*a*-5*d* and 6 show several possible ways in which the sealing tape can be arranged within a sealing tape roll. In the case of FIGS. 5*a*-5*d* and FIG. 6, it should be noted that only a part of the sealing tape roll is shown. In the full cross section, the same elements would appear again as mirror images under those shown here.

In FIGS. 5*a*-5*d*, first foam strip 2 and second foam strip 4 are arranged next to each other and wound around a winding tube 60. Because of the way a roll is formed, several turns of first foam strip 2 lie on top of each other, and several turns of second foam strip 4 also lie on top of each other. When the sealing tape is realized in the form of a roll, first foam strip 2 and second foam strip 4 are both held in the precompressed state.

Figure 5A:
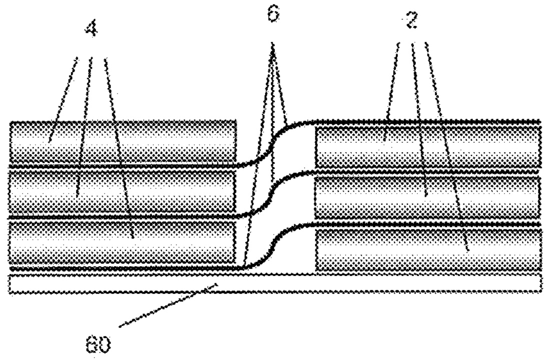
FIGS. 5*a*-5*d* are cross-sectional views of parts of various sealing tape rolls, each with a sealing tape according to the invention.
Figure 5B:
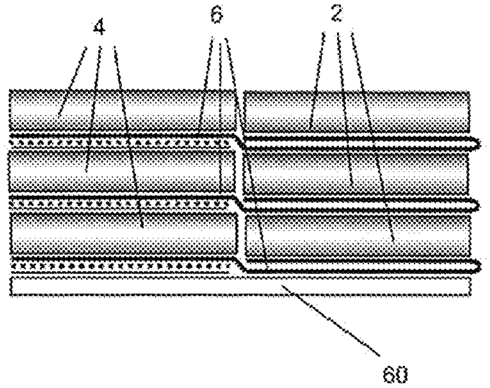

In FIG. 5*b*, first foam strip 2 has been turned 180° and now lies with its top surface 12 facing downward within the sealing tape roll.

Figure 5C:
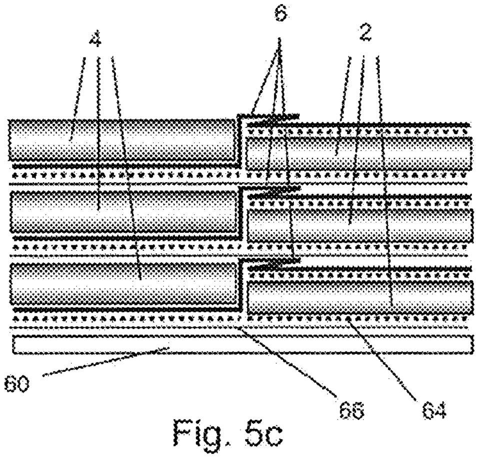

In FIG. 5*c*, part of middle section 22 of sheet-like connecting element 6 is formed into a loop, which is set down onto first foam strip 2. Each loop therefore lies between two adjacent turns of first foam strip 2. In this embodiment, first and the second pressure-sensitive adhesive layers 26, 30 are designed as integral parts of each other and are formed by a pressure-sensitive adhesive strip 64, which is covered by only a single cover sheet 66, which replaces two cover sheets 28, 32. In a case such as this, pressure-sensitive adhesive strip 64 must be sufficiently stretchable, so that, when the sealing tape is installed in the joint, first foam strip 2 can be attached a sufficient distance away from second foam strip 4, pressure-sensitive adhesive strip 64 thus spanning the distance between foam strips 2, 4. In this way, the sealing tape can be handled more easily when joints of different depths are to be sealed.

Figure 5D:
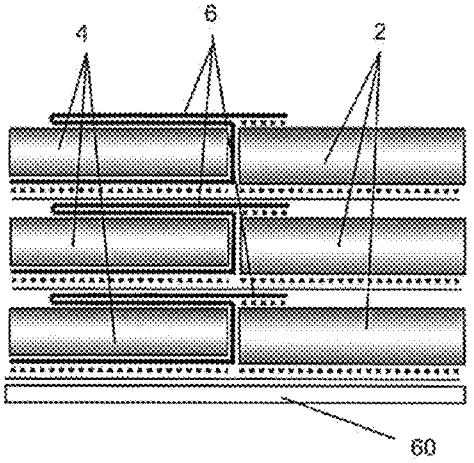

The embodiment in FIG. 5*d* differs from the embodiment of FIG. 5*c* in that the loop formed out of middle section 22 of sheet-like connecting element 6 lies on top surface 34 of second foam strip 4. First attachment section 8 of sheet-like connecting element 6 covers only a small area of top surface 12 of first foam strip 2.

Figure 6:
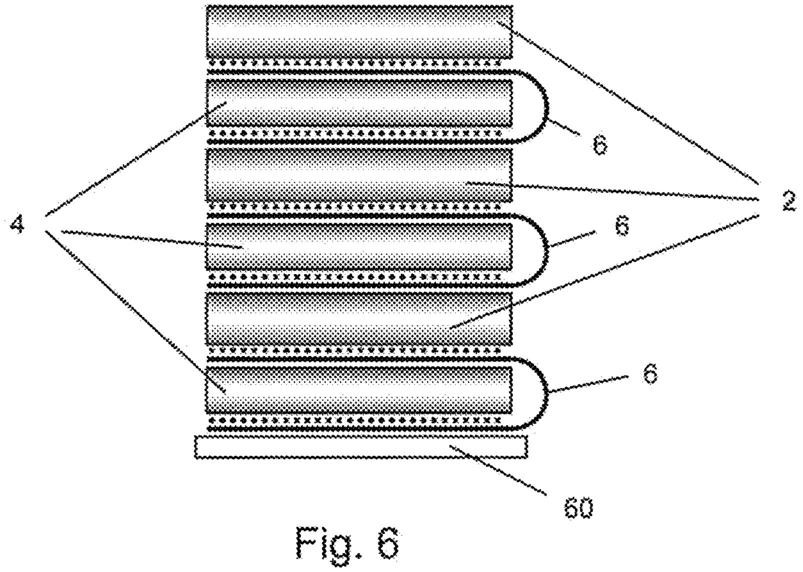
FIG. 6 is a cross-sectional view of a part of another sealing tape roll with a sealing tape according to the invention.

In the embodiment shown in FIG. 6, first foam strip 2 has been folded over onto second foam strip 4, so that first and the second foam strips 2, 4 now rest on top of each other. After the sealing tape has been wound up into a roll, layers of first foam strip 2 alternate with layers of second foam strip 4 within the roll.

Figure 7:
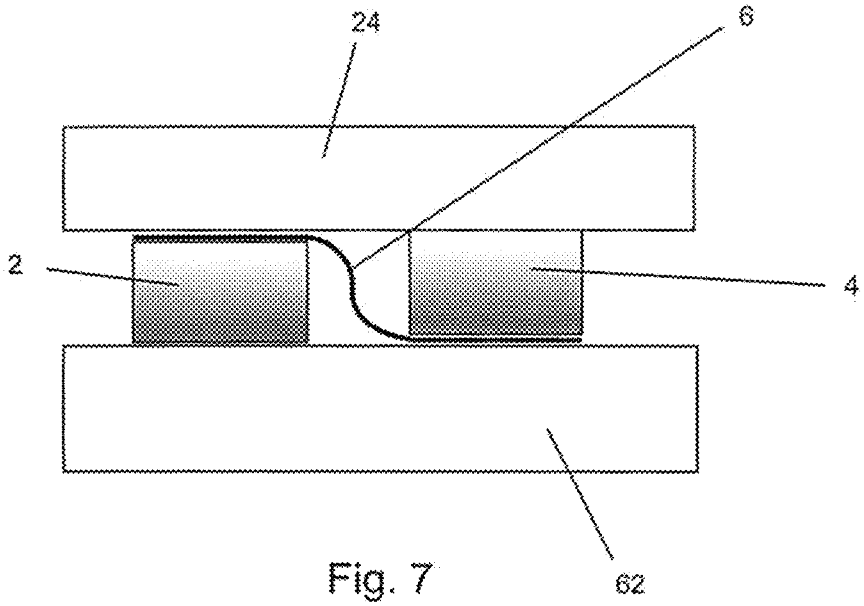
FIG. 7 is a cross-sectional view of a first arrangement of the sealing tape in a joint.
Figure 8:
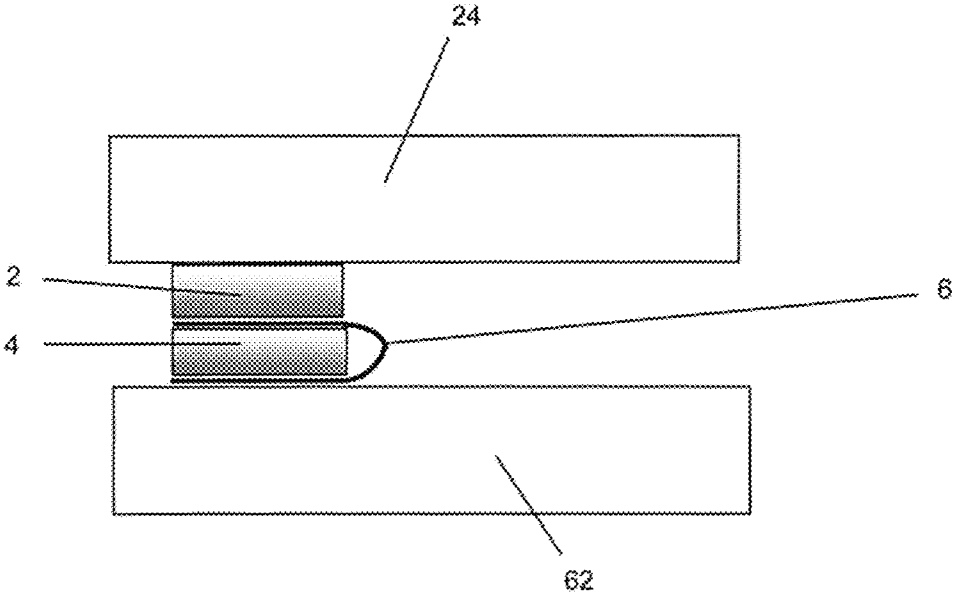
FIG. 8 is a cross-sectional view of a second arrangement of the sealing tape in a joint.
Figure 9:
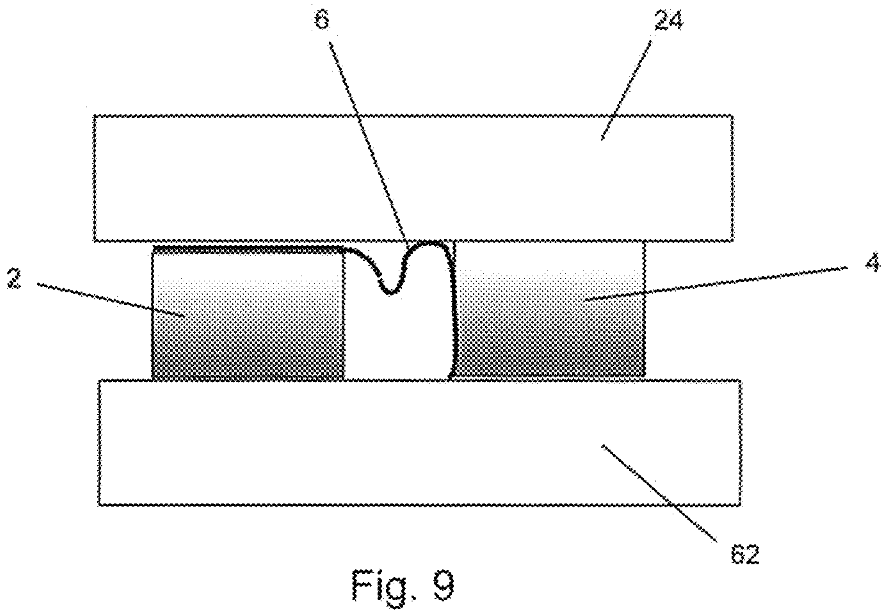
FIG. 9 is a cross-sectional view of a third arrangement of the sealing tape in a joint.

FIGS. 7-9 show various ways in which the sealing tape can be installed in a joint. The adhesive layers or pressure-sensitive adhesive layers are not shown. In FIG. 7, first foam strip 2 and second foam strip 4 are attached to structural component 24 and fill the joint, which is defined by the masonry 62. First foam strip 2 and second foam strip 4 are arranged next to each other, and between first and second foam strips 2, 4, an intermediate space is formed, through which sheet-like connecting element 6 or, more precisely, its middle section 22, passes. In this way, the outer and inner areas of the joint are sealed, and a layer of air is enclosed between foam strips 2, 4, which also has an insulating effect. This offers several advantages such as less material consumption and the ability to bridge joints of any depth. More particularly, to bridge the distance between the edge of the joint facing the room and the edge of the joint facing the outside (e.g., 15-30 cm). Because sheet-like connecting element 6, which is preferably designed to be airtight, is oriented transversely to the joint, furthermore, it is also possible to maintain airtightness in the area of the joint facing the room, whereas the foam in the outer edge area of the joint comprises a lower vapor diffusion resistance.

In the arrangement of the sealing tape in the joint shown in FIG. 8, in which first and second foam strips 2, 4 lie on top of each other, airtightness is not guaranteed. This can nevertheless be sufficient for many applications A rotated arrangement of foam strips 2, 4 with respect to each other is also conceivable, as shown in FIG. 9, wherein the expansion behavior of second foam strip 4 shown here is limited by sheet-like connecting element 6 attached to it, which does not allow any great differences to occur between the compressed and the expanded state.

Figure 10A:
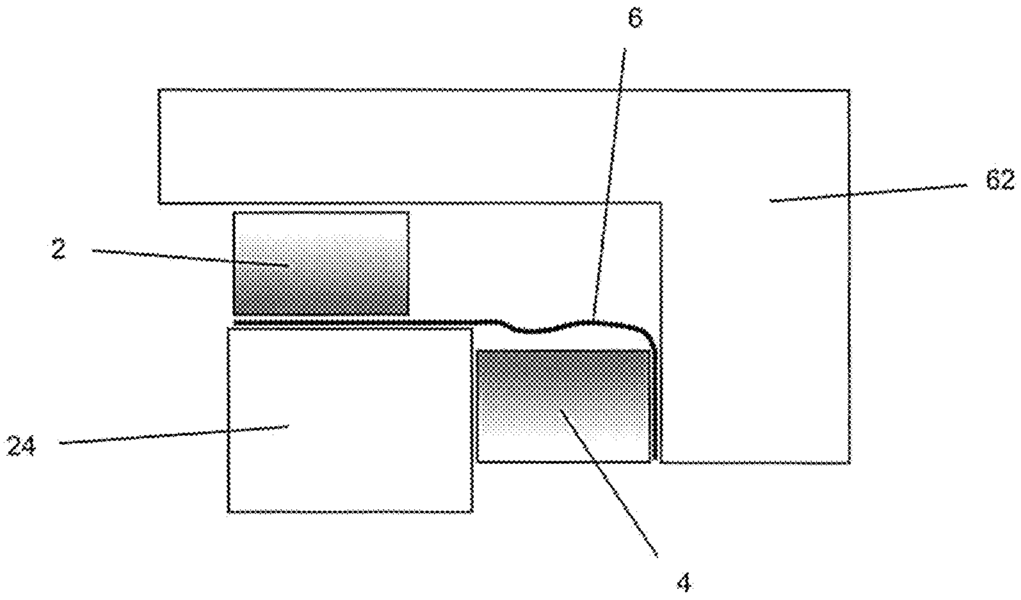
FIGS. 10*a* and 10*b* are cross-sectional views of additional arrangements of the sealing tape in a joint.
Figure 10B:
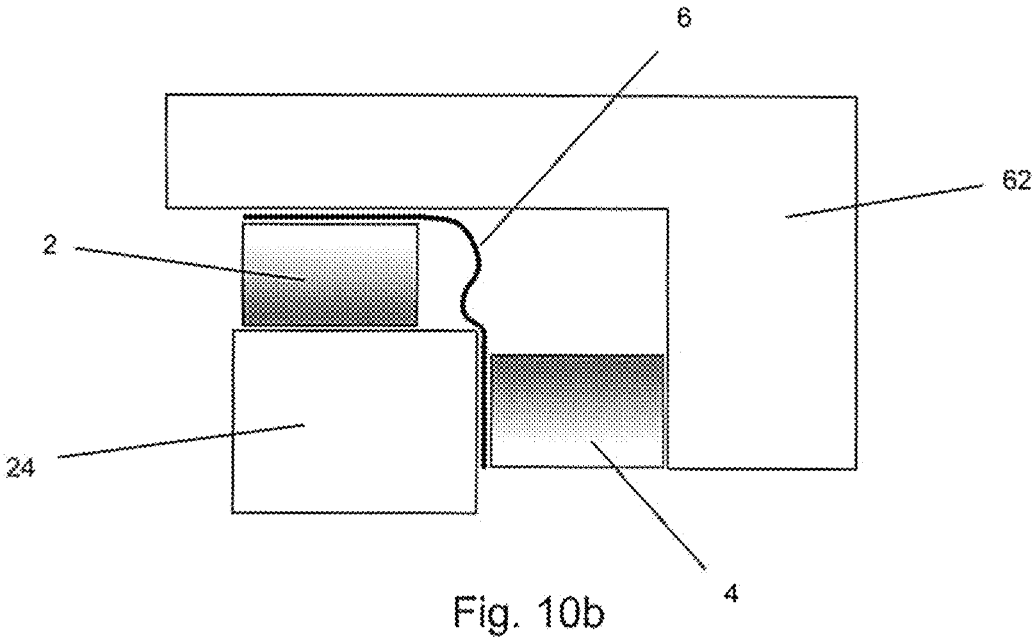

FIGS. 10*a* and 10*b* show two additional installation situations for the sealing tape. Here two foam strips 2, 4 are also rotated with respect to each other, wherein the standard arrangement of pressure-sensitive adhesive layers 26, 30 of FIG. 1 is suitable for the attachment of foam strips 2, 4 to structural component 24 and to masonry 62.

After the sealing tape has been unwound from the sealing tape roll, there is usually only a certain amount of time available to attach the sealing tape to structural component 24 and to insert structural component 24 into the joint in masonry 62 provided for it before the delayed expansion of foam strips 2, 4 takes place. Because modern impregnations make it possible to delay the expansion of foam strips 2, 4 by several hours, this no longer represents any essential limitation. When the sealing tape is in the form of strips, it is necessary in any case to compress the strip before inserting it into the joint.

The sealing tape could basically also be attached to structural component 24 to be sealed before the component is transported from the manufacturer's site. In this case it would be necessary, however, for the sealing tape to be prevented from expanding by a wrapping (not shown). After installation of the component in the intended opening in the building, it would then be necessary merely to open the wrapping on site, whereupon foam strips 2, 4 expand outward and guarantee the sealing of the joint.

Many other embodiments of the present invention are also conceivable. The details presented with reference to any of FIGS. 1-10 can also be used in any of the respective other embodiments shown.

Reference throughout this specification to "one embodiment," "an embodiment," "a preferred embodiment," "alternate embodiment" or similar language means that a particular feature, structure, or characteristic described in connection with the embodiment is included in at least one embodiment of the present invention. Thus, appearances of the phrases "in one embodiment," "in an embodiment," "in a preferred embodiment," "in an alternate embodiment," and similar language throughout this specification may, but do not necessarily, all refer to the same embodiment.

Furthermore, the described features, advantages, and characteristics of the invention may be combined in any suitable manner in one or more embodiments. One skilled in the relevant art will recognize that the invention may be practiced without one or more of the specific features or advantages of a particular embodiment. In other instances, additional features and advantages may be recognized in certain embodiments that may not be present in all embodiments of the invention.

While the present invention has been described in connection with certain exemplary, alternate or specific embodiments, it is to be understood that the invention is not limited to the disclosed embodiments, but, on the contrary, is intended to cover various modifications, alternatives, modifications and equivalent arrangements as will be apparent to those skilled in the art. Any such changes, modifications, alternatives, modifications, equivalents and the like may be made without departing from the spirit and scope of the invention.

What is claimed is:

1. A sealing tape for sealing a joint, comprising:

a first foam strip having a top surface and a bottom surface, a second foam strip having a top surface and a bottom surface, the second foam strip being separate from the first foam strip, and a sheet-type connecting element, which comprises a first attachment section, a second attachment section, and a middle section between the first and second sections, wherein at least part of the first attachment section is attached to the first foam strip, at least part of the second attachment section is attached to the second foam strip, and the middle section extends from the top surface of the first foam strip to the bottom surface of the second foam strip, wherein the top surface of the foam strips designates whichever surface of the foam strip in question is facing upward when the middle section is stretched out horizontally straight. and wherein the bottom surface designates whichever surface is facing downward when the middle section is stretched out horizontally straight: and wherein at least part of the top surface of the first foam strip and at least part of the bottom surface of the second foam strip are covered by the sheet-type connecting element.

2. The sealing tape of claim 1 wherein the middle section of the sheet-type connecting element is not attached to the first or to the second foam strip.

3. The sealing tape of claim 1 wherein a first pressure-sensitive adhesive layer, which is covered by a cover sheet, is arranged on the bottom surface of the first foam strip.

4. The sealing tape of claim 3 wherein a second pressure-sensitive adhesive layer, which is covered by a second cover sheet, is arranged on the bottom surface of the second foam strip.

5. The sealing tape of claim 4 wherein the second pressure-sensitive adhesive layer is arranged under the second attachment section of the sheet-type connecting element.

6. The sealing tape of claim 4 wherein the first pressure-sensitive adhesive layer and the second pressure-sensitive adhesive layer are designed as integral parts of each other and are formed by a one-piece, stretchable pressure-sensitive adhesive strip.

7. The sealing tape of claim 4 wherein a third pressure-sensitive adhesive layer, which is covered by a third cover sheet, is arranged on the top surface of the first foam strip.

8. The sealing tape of claim 7 wherein a fourth pressure-sensitive adhesive layer, which is covered by a fourth cover sheet, is arranged on the top surface of the second foam strip.

9. The sealing tape of claim 8 wherein the third pressure-sensitive adhesive layer is arranged above the first attachment section of the sheet-type connecting element.

10. The sealing tape of claim 1 wherein the first attachment section and the second attachment section of the sheet-type connecting element are attached to the first and second foam strips by means of first and second adhesive layers.

11. The sealing tape of claim 1 wherein the first attachment section or the second attachment section of the sheet-type connecting element comprises openings.

12. The sealing tape of claim 1 wherein the top surface of the second foam strip is shorter than the bottom surface of the second foam strip, and the bottom surface of the first foam strip is shorter than the top surface of the first foam strip.

13. The sealing tape of claim 1 wound up into a sealing tape roll, wherein the first foam strip and the second foam strip are wound up next to each other around a winding tube.

14. The sealing tape of claim 1 wound up into a sealing tape roll, wherein the first foam strip and the second foam strip are wound up on top of each other around a winding tube.

15. A structural component to which a sealing tape for sealing a joint is attached, the sealing tape comprising:

a first foam strip having a top surface and a bottom surface, a second foam strip having a top surface and a bottom surface, the second foam strip being separate from the first foam strip, and a sheet-type connecting element, which comprises a first attachment section, a second attachment section, and a middle section between the first and second sections, wherein at least part of the first attachment section is attached to the first foam strip, at least part of the second attachment section is attached to the second foam strip, and the middle section extends from the top surface of the first foam strip to the bottom surface of the second foam strip, wherein the top surface of the foam strips designates whichever surface of the foam strip in question is facing upward when the middle section is stretched out horizontally straight, and wherein the bottom surface designates whichever surface is facing downward when the middle section is stretched out horizontally straight;

wherein at least part of the top surface of the first foam strip and at least part of the bottom surface of the second foam strip are covered by the sheet-type connecting element;

wherein the first foam strip and the second foam strip are arranged next to each other, and an intermediate space, through which the middle section of the sheet-type connecting element extends, is formed between the first and second foam strips.

* * * * *